(12) United States Patent
Sankey et al.

(10) Patent No.: US 6,719,136 B1
(45) Date of Patent: *Apr. 13, 2004

(54) TEAR RESISTANT SECURITY CONTAINER

(75) Inventors: James K. Sankey, Hudson, OH (US); Lawrence R. Yeager, Uniontown, OH (US); Ronald M. Marsilio, Canton, OH (US)

(73) Assignee: Nexpak Corporation, North Canton, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 106 days.

(21) Appl. No.: 09/208,119

(22) Filed: Dec. 9, 1998

(51) Int. Cl.[7] .............................................. B65D 85/575
(52) U.S. Cl. ............................. 206/387.11; 206/387.13; 206/807; 206/1.5
(58) Field of Search ...................... 206/387.1, 387.11, 206/387.13, 308.2, 308.3, 472, 807, 1.5

(56) References Cited

U.S. PATENT DOCUMENTS

| | | | | |
|---|---|---|---|---|
| 4,184,594 A | * | 1/1980 | Hehn | 206/387.14 |
| 4,428,481 A | * | 1/1984 | Basili | 206/493 |
| 4,469,225 A | * | 9/1984 | Takahashi | 206/387.1 |
| 4,593,814 A | * | 6/1986 | Hagiwara et al. | 206/387.1 |
| 4,658,955 A | | 4/1987 | Eichner | |
| 5,375,712 A | | 12/1994 | Weisburn | |
| 5,690,224 A | * | 11/1997 | Koizumi | 206/387.1 |
| 5,782,350 A | * | 7/1998 | Weisburn et al. | 206/308.2 |
| 5,802,890 A | | 9/1998 | Espada-Velasco | |
| 5,823,341 A | * | 10/1998 | Nakasuji | 206/387.11 |
| 5,899,327 A | * | 5/1999 | Sykes | 206/312 |
| 5,944,185 A | | 8/1999 | Burdett et al. | |
| 6,135,280 A | | 10/2000 | Burdett et al. | |

\* cited by examiner

*Primary Examiner*—Shian Luong
(74) *Attorney, Agent, or Firm*—Renner, Otto, Boisselle & Sklar, LLP

(57) ABSTRACT

A security container for an item of recorded media includes features that prevent the security container from being torn open. The container includes a pair of flanges that extend out from an inset sidewall to cover the spine when the container is closed. The spine does not extend beyond the flanges such that no portion of the spine can be securely grasped. In another embodiment, the portions of the spine that extend beyond the sidewall are removed such that the spine extends only between the inset end walls of the sidewall.

16 Claims, 4 Drawing Sheets

TEAR RESISTANT SECURITY CONTAINER

BACKGROUND OF THE INVENTION

1. Technical Field

This invention generally relates to storage containers for recorded media and, more particularly, to a security container for recorded media that can only be opened with a specific key. Specifically, this invention relate's to a security container for an item of recorded media that includes features that prevent the spine of the security container from being securely grasped and torn open.

2. Background Information

Renting items of recorded media such as video cassettes and video games has become immensely popular in recent times given the ever increasing number of items available for home viewing and the use as well as the decrease in price of the machines that play the media. Typical rental stores display the items available for rental in storage boxes that protect the items from dust, ultraviolet light, and damage from impact if accidentally dropped. Stores protect themselves against theft by shoplifting by placing one or more EAS (electronic article surveillance) tags on or inside the item of recorded media. An EAS tag may also be placed in the storage box. An EAS tag is adapted to activate an alarm when passed through a sensing device that may be disposed around the exit of the store. It is generally desirable to place the EAS tags in places where they cannot be easily removed by a shoplifter.

Most rental establishments place older rental stock out for sale when it no longer needs the item for rental. When items are put out for sale, the EAS tags are removed from the items and reused on items that are being rented. The EAS tags are removed from the items of recorded media prior to sale so that the purchaser will not activate the alarm systems in other stores with the EAS tags. Without the EAS tags, a store must protect itself against shoplifting by placing an EAS tag on the storage container holding the item for sale. It is desirable that the EAS tag be placed on the storage container in a way that allows a sales clerk to quickly and easily remove the tag after the sale is made but also in a manner that prevents a shoplifter from easily removing the tag. Placement of the EAS tag in such a position is, however, difficult because a storage container provides few, if any, areas where the EAS tag may be hidden. If the EAS tag is placed on the storage container in a fashion such that it can be easily removed, a shoplifter may simply remove the tag and steal the item without activating an alarm. It is thus desired in the art to provide a storage container having locking holes that can accept a lock containing an EAS tag when the container is used to sell an item of recorded media.

Different types of storage box and lock combinations are known in the art and are generally configured to prevent a thief from simply breaking the lock off the storage box with a small pry bar. One problem inherent with all security containers is that they are subject to attack by destroying the container. In the field of art for protecting items of recorded media, a thief will try to open the container quickly in a retail environment without drawing attention to themselves. In this environment, the thief cannot typically use complex tools. The thief must thus rely on a simple pry bar or his hands to break open the security container and gain access to the contents.

Many security containers have living hinges formed by reducing the thickness of the plastics in selected areas. Although such designs are desirable because they reduce the cost of manufacturing the security container, the areas of reduced thickness are vulnerable to attack by tearing. For instance, a typical VHS-style security container includes a pair of hinges that connect a back wall or spine to a base and a lid. It is known in the art that a thief can tear the spine off of the security container along these hinges to compromise the container and steal the contents of the container. It is thus desired in the art to provide a configuration for a security container that prevents a thief from tearing the spine from the container. The invention must be inexpensive to implement and not change the overall size or appearance of the accepted industry standards for recorded media containers.

SUMMARY OF THE INVENTION

In view of the foregoing, a principal objective of the present invention is to provide a security container that resists tearing.

Another objective of the present invention is to provide a security container that prevents a thief from obtaining a secure grip on the spine of the container to deter tearing.

Another objective of the present invention is to provide a security container that prevents a thief from grasping the spine of the container by providing a spine that does not extend beyond the sidewall of the container.

Another objective of the present invention is to provide a security container that includes a flange secured to a sidewall that abuts the spine of the container when the container is closed to prevent a thief from grasping the spine.

Another objective of the present invention is to provide a security container having features that protect the spine against tearing that may be easily added to existing security container designs.

Another objective of the present invention is to provide a security container having features that protect the spine against attack by tearing that do not require additional materials to be used in addition to the materials that form the security container.

Another objective of the present invention is to provide a security container having features that prevent the spine from being easily torn from the security container that do not alter the configuration of the hinges of the security container.

Another objective of the present invention is to provide a security container that is of simple construction, that achieves the stated objectives in a simple, effective, and inexpensive manner, and that solves the problems and that satisfies the needs existing in the art.

These and other objectives and advantages are obtained by a security container including a base having a bottom wall and a sidewall; a spine connected to the bottom wall of the base with a first living hinge; a lid connected to the spine with a second living hinge, the lid movable between open and closed positions; the spine not extending beyond the sidewall when the lid is in the closed position; and a locking mechanism that selectively locks the lid in the closed position.

BRIEF DESCRIPTION OF THE DRAWINGS

The preferred embodiments of the invention, illustrative of the best mode in which the applicants contemplate applying the principles of the invention, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENTS

Figure 1:
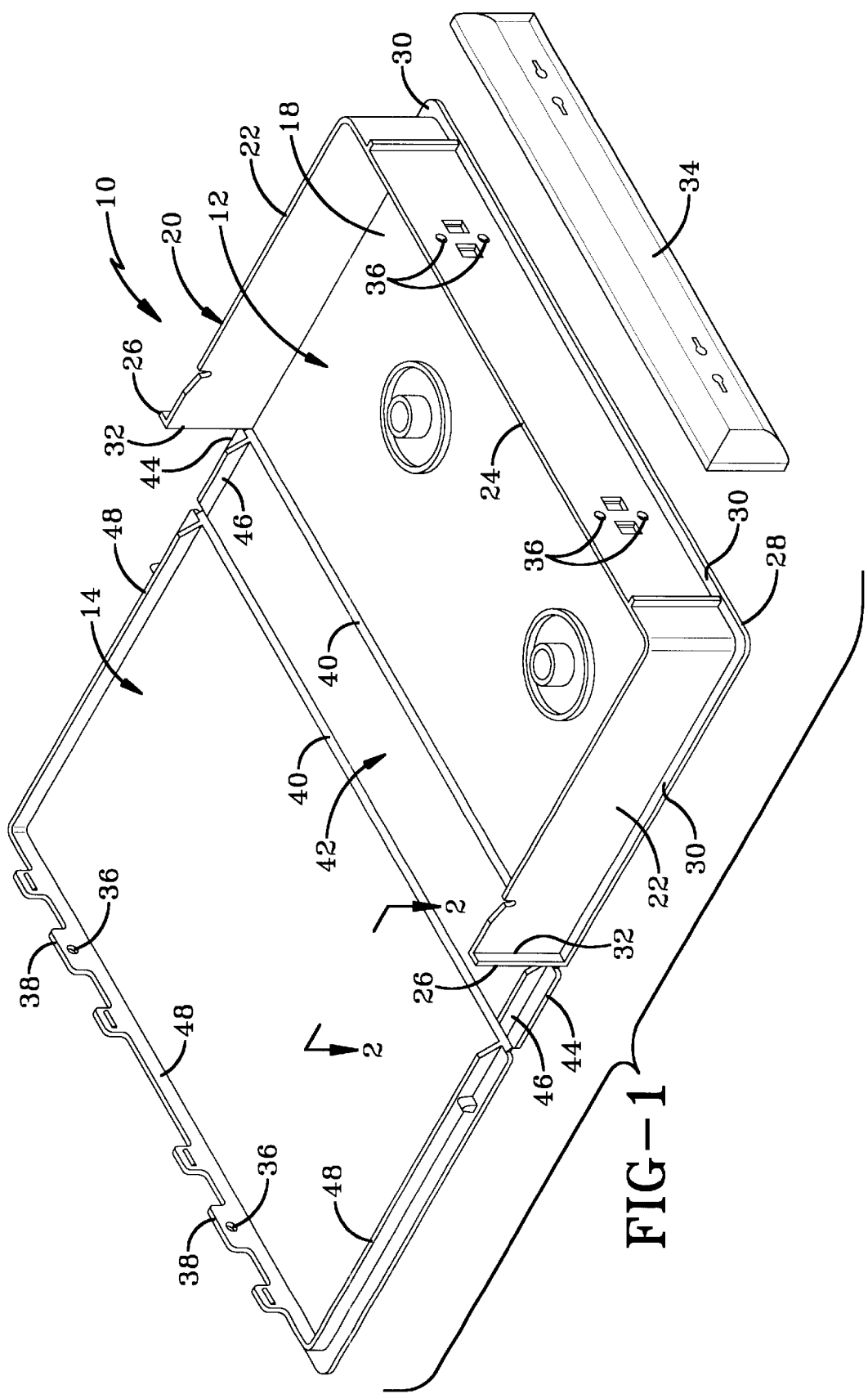
FIG. 1 is a perspective view of one embodiment of a security container made in accordance with the objectives of the present invention.
Figure 2:
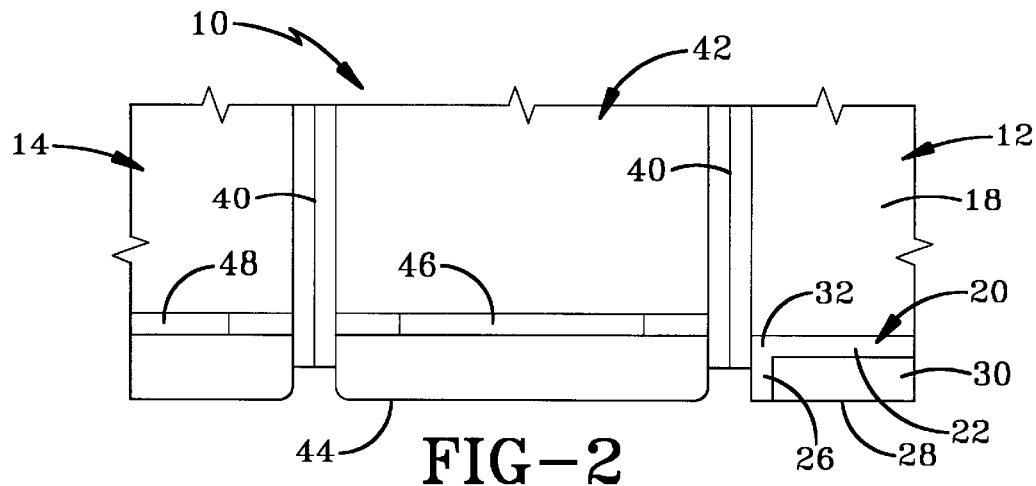
FIG. 2 is a top plan view of one end of the spine of the security container taken along line 2—2 of FIG. 1.
Figure 3:
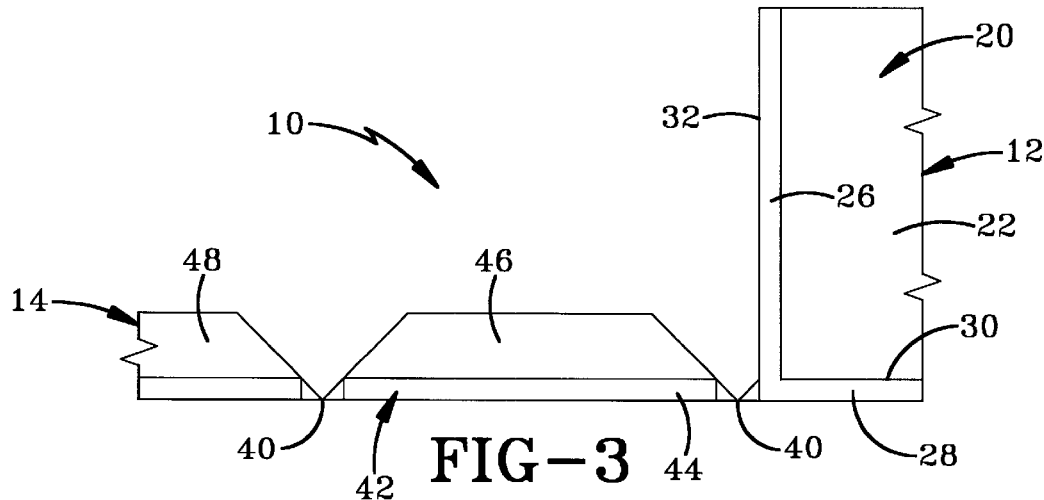
FIG. 3 is a side elevational view of the end of the spine of FIG. 2.

One embodiment of the security container of the present invention is indicated generally by the numeral 10 in FIGS. 1–5. Security container 10 generally includes a base, indicated generally at 12, and a lid, indicated generally at 14, that is hingedly connected to base 12 and movable between open and closed positions. The open position is depicted in FIGS. 1–3 with the closed position being depicted in FIGS. 4 and 5. It is to be noted that the particular embodiment of security container 10 depicted in the drawings is designed and configured for holding a VHS video cassette. The concepts of the present invention may be employed with a wide variety of differently shaped security containers 10 configured to hold other types of recorded media such as video game cartridges, cassette tapes, compact discs, DVDs, computer discs, and the like. The VHS video cassette embodiment is depicted only to provide an example of the present invention and to provide an embodiment on which to describe the elements of the invention and their interrelationship.

Base 12 generally includes a bottom wall 18 from which projects a sidewall 20. In the embodiment of the invention depicted in FIGS. 1–5, sidewall 20 includes a pair of end walls 22, a front wall 24, and a pair of outwardly extending flanges 26. End walls 22 and front wall 24 are inwardly disposed from the outer edge 28 of bottom wall 18 to form a lower ledge 30 extending about sidewall 20 and exteriorly thereof. In accordance with one of the objectives of the present invention, each flange 26 extends out from the ends 32 of end walls 22 to outer edge 28 of bottom wall 18 such that each flange 26 extends entirely across lower ledge 30. Each flange 26 is also substantially the same height as each end wall 22. Each flange 26 is fabricated from the same material as walls 22 and 24 and is substantially the same thickness as walls 22 and 24.

Figure 11:
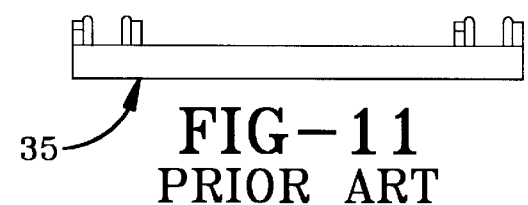
FIG. 11 is a side view of a prior art key.

In the embodiment of the invention depicted in the drawings, security container 10 is selectively locked by a lock 34 that includes pins (not shown) that extend through locking holes 36 formed in front wall 24 and locking tabs 38 that extend from lid 14. Tabs 38 will frictionally hold lid 14 in a closed position but will not lock container 10 until lock 34 is used. The operation of lock 34 and its use with locking holes 36 is fully described in U.S. patent application Ser. No. 09/015,085, filed Jan. 29, 1998, which now U.S. Pat. No. 5,944,185 is owned by the assignee of the present application. The disclosures of this application are incorporated herein by reference. Lock 34 is unlocked with key 35 (FIG. 11) when the user inserts key 35 in lock 34. Although the concepts of the present invention are disclosed and discussed with respect to this specific security device and security container, the concepts of the present invention may also be incorporated into other security containers that use different types of security or locking devices. Examples of such other locking mechanisms may be seen in U.S. Pat Nos. 5,375,712 and 4,658,955.

Figure 4:
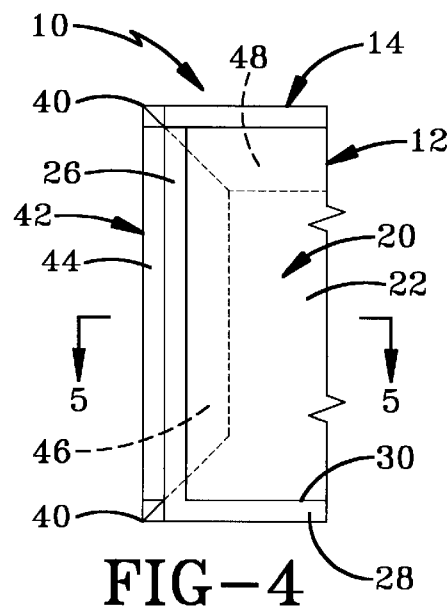
FIG. 4 is a side elevational view of the end of the spine when the security container is closed.
Figure 5:
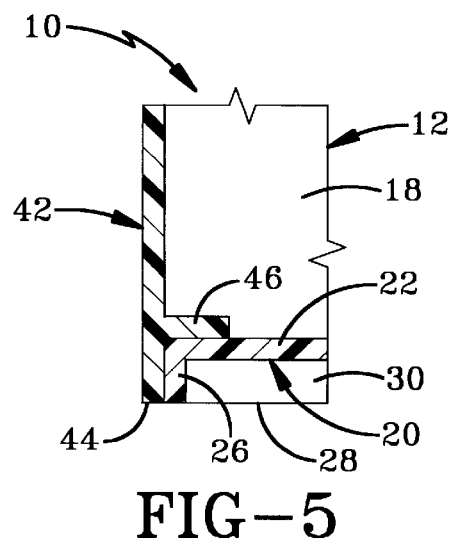
FIG. 5 is a sectional view taken along line 5—5 of FIG. 4.
Figure 6:
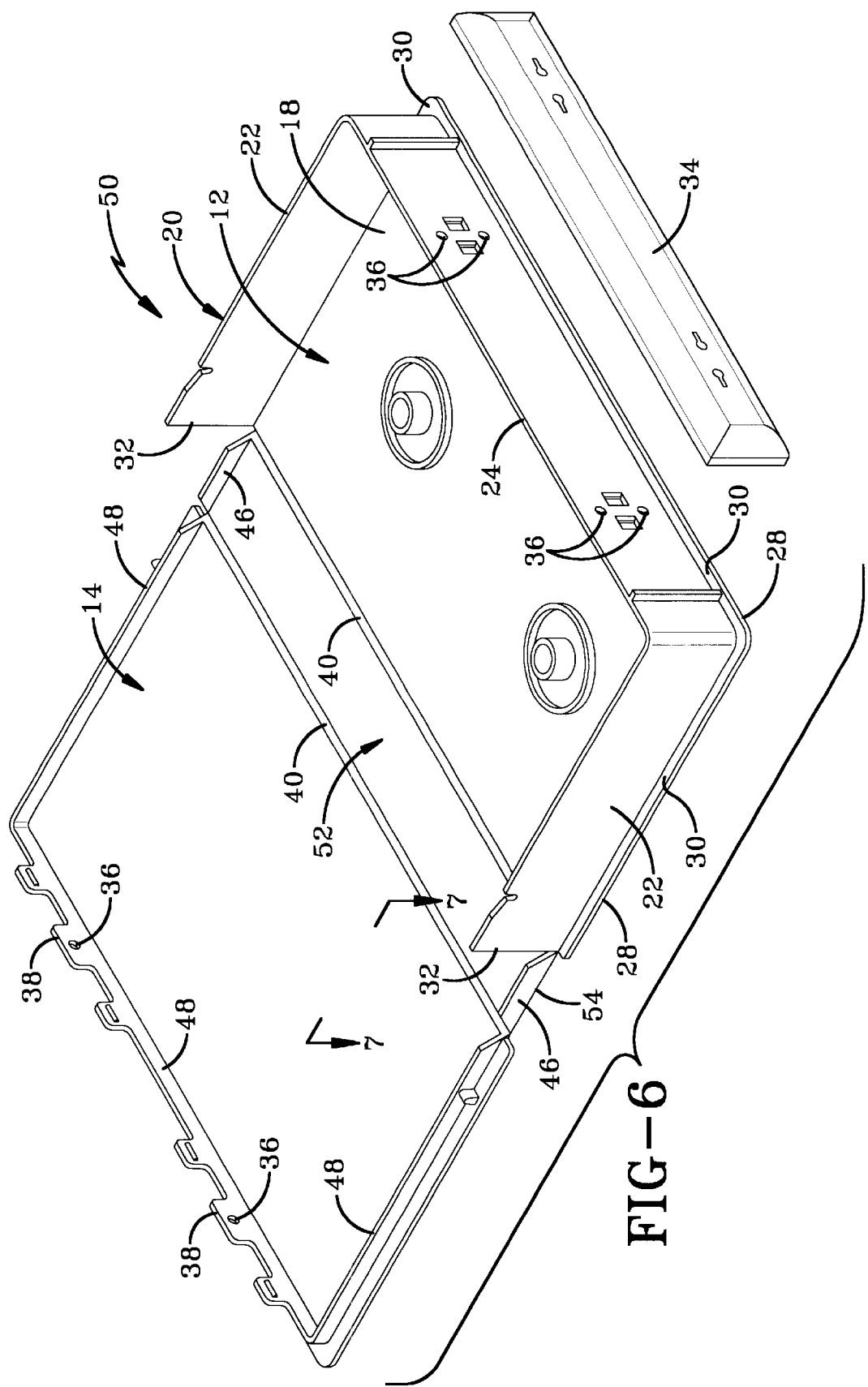
FIG. 6 is a perspective view of another embodiment of a security container made in accordance with the objectives of the present invention.
Figure 7:
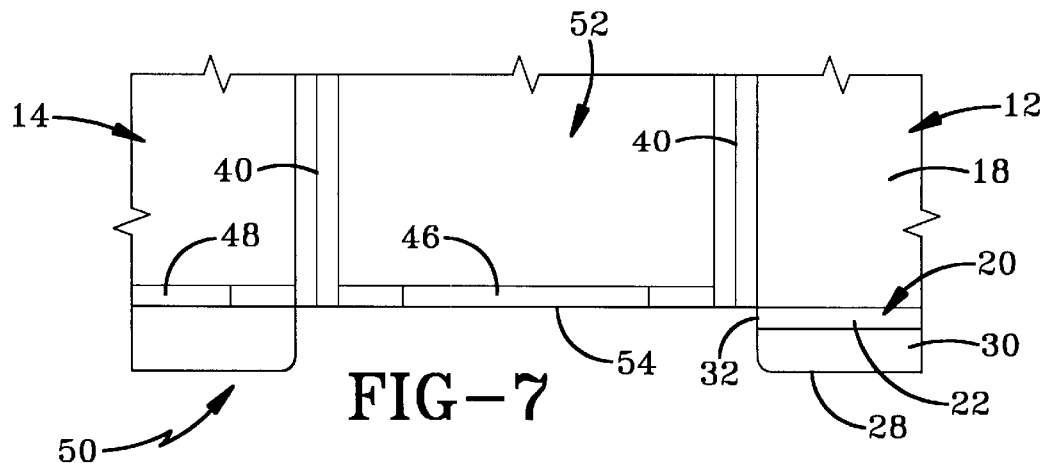
FIG. 7 is a top plan view of one end of the spine of the security container taken along line 7—7 of FIG. 6.
Figure 8:
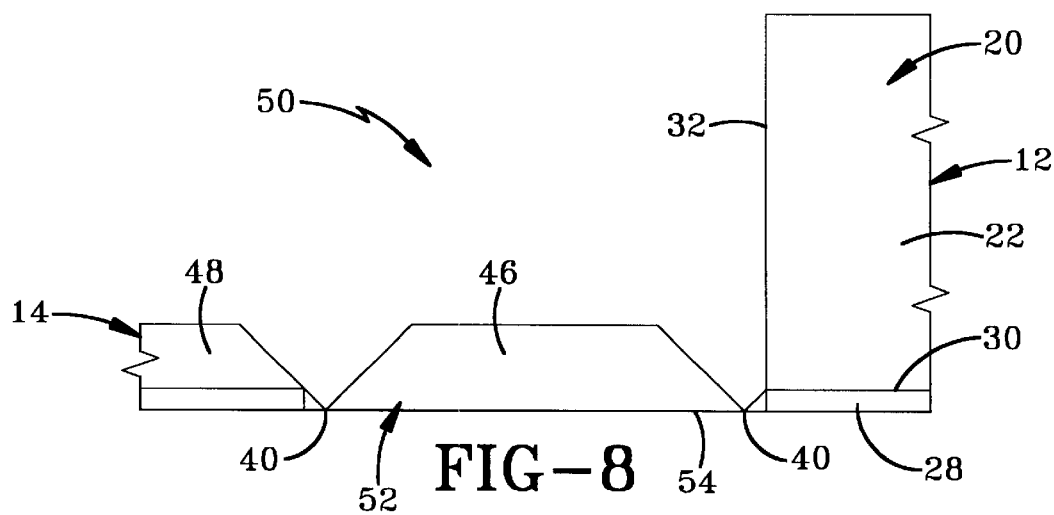
FIG. 8 is a side elevational view of the end of the spine of FIG. 7.
Figure 9:
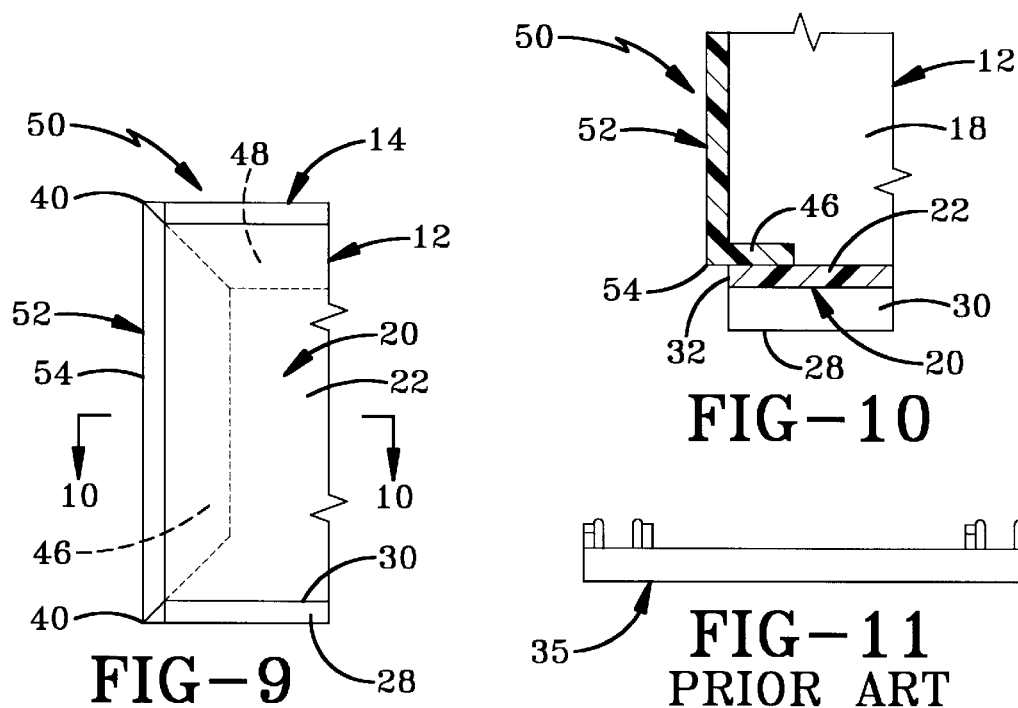
FIG. 9 is a side elevational view of the end of the spine when the security container is closed.
Figure 10:
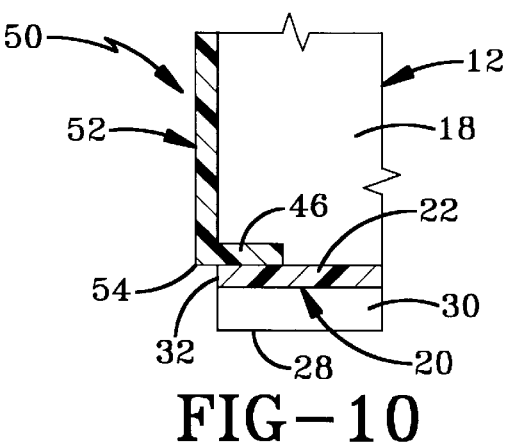
FIG. 10 is a sectional view taken along line 10—10 of FIG. 9.

Lid 14 is connected to base 12 by a pair of living hinges 40. One living hinge 40 connects lid 14 to a spine 42 with the other living hinge 40 connecting spine 42 to base 12. As discussed in the Background Information section of this specification, living hinges 40 are areas of reduced thickness (as shown in FIG. 3) that subject security container 10 to attack by tearing. In accordance with one of the objectives of the present invention, spine 42 does not extend beyond sidewall 20 as shown in FIG. 5, and particularly does not extend beyond flanges 26. This configuration prevents the shoplifter from directly grasping spine 42 when security container 10 is closed and tearing spine 42 away from base 12 and lid 14. In the embodiment of the invention depicted in FIGS. 1–5, each end 44 of spine 42 extends out to the same distance as outer edge 28 of base 12. Flanges 26 thus abut spine 42 and completely cover the previously exposed and vulnerable portions of spine 42 when security container is closed as depicted in FIGS. 4 and 5.

Spine 42 additionally includes a pair of tabs 46 that are disposed to slide inside sidewall 20 when lid 14 is in the closed position. Tabs 46 provide an additional security feature that prevents spine 42 from being moved out of position by a shoplifter. Tabs 46 also prevent a pry bar from being inserted into security container 10. Lid 14 includes a projection or U-shaped rib 48 that also fits inside sidewall 20 when lid 14 is closed to hold lid 14 in position and to prevent a pry bar from being inserted within security container 10.

Flanges 26 thus prevent a shoplifter from grasping spine 42 when security container 10 is closed. Flanges 26 thus improve the security features of security container 10 by reducing the possibility that security container 10 can be compromised by tearing. It being understood that no portion of spine 42 extends beyond sidewall 20, and in particular flanges 26 of security container 10.

Another embodiment of the security container of the present invention is indicated generally by the numeral 50 in FIGS. 6–10. Security container 50 includes many of the same elements as security container 10 and these elements are indicated by the same numbers used above. The difference between security container 50 and security container 10 is the construction of the spines and sidewalls. The spine 52 of container 50 extends only to tabs 46 and thus does not extend beyond ends 32 of sidewall 20. Spine 52 thus includes ends 54 that are disposed within the boundaries of sidewall 20 at all times. By not extending beyond sidewall 20, spine 52 does not provide any structure for a shoplifter to grasp when attempting to compromise security container 50. With this construction, flanges 26 are not needed to cover the spine.

Accordingly, the improved tear resistant security container is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved tear resistant security container is construed and used, the characteristics of the construction, and the advantageous, new and useful results obtained; the new and useful structures, devices, elements, arrangements, parts and combinations, are set forth in the appended claims.

We claim:

1. A security container for securely holding an item of recorded media, the security container capable of being locked to prevent unauthorized access by shoplifters; the security container comprising:
   a base having a bottom wall and sidewall;
   a spine connected to the bottom wall of the base with a first living hinge;
   a lid connected to the spine with a second living hinge, the lid movable between open and closed positions with respect to the base;
   the spine not extending beyond the sidewall when the lid is in the closed position;
   the lid and base at least partially defining locking holes;
   the locking holes being aligned and forming a substantially common axis when the lid is in the closed position;
   at least one of the locking holes moving substantially perpendicular to the common axis when the lid is initially moved from the closed position toward the open position;
   a locking mechanism selectively locking the lid in the closed position; the locking mechanism only releasing the lid through the use of a key.

2. The security container of claim 1, wherein the base has an edge; the sidewall being disposed inward of the edge of the base to form a ledge.

3. The security container of claim 1, wherein the sidewall has a pair of ends adjacent the spine; the sidewall including a flange extending out from the sidewall at each of the ends to the edge of the base.

4. The security container of claim 3, wherein the spine extends the same distance as the edge of the base; the flanges abutting the spine when the lid is in the closed position.

5. The security container of claim 4, wherein the sidewall defines the locking holes that align with the locking holes formed in the lid when the lid is in the closed position.

6. The security container of claim 5, wherein at least two locking holes are formed in the sidewall.

7. The security device of claim 1, further comprising a pair of tabs mounted on the spine, the tabs being disposed inward of the sidewall when the lid is in the closed position, the spine having first and second ends; one tab being positioned at the first end of the spine and one tab being positioned at the second end of the spine.

8. The security container of claim 1, wherein the locking mechanism is detached from the base when unlocked.

9. A security container for securely holding an item of recorded media, the security container capable of being locked to prevent unauthorized access by shoplifters; the security container comprising:
   a base having a bottom wall and a sidewall, the bottom wall having an outer edge;
   a spine hingedly connected to the bottom wall of the base;
   a lid hingedly connected to the spine, the lid movable between open and closed positions;
   the sidewall having a pair of end walls and a front wall;
   a flange connected to each end wall and extending outwardly therefrom;
   said flanges abutting the spine when the lid is in the closed position; no portion of the spine extending beyond the flanges; and
   a locking mechanism selectively locking the lid in the closed position; the locking mechanism only releasing the lid through the use of a key.

10. The security container of claim 9, wherein each end wall is disposed inwardly of the outer edge of the bottom wall to form lower ledges, each flange extending across a lower ledge.

11. The security container of claim 9, wherein the sidewall defines at least one locking hole, the lid defining at least one locking hole; the locking hole in the sidewall aligning with the locking hole in the lid when the lid is closed.

12. The security container of claim 9, wherein each flange is connected to the base.

13. The security container of claim 9, wherein the locking mechanism is detached from the base when unlocked.

14. A security container for securely holding an item of recorded media, the security container capable of being locked to prevent unauthorized access by shoplifters; the security container comprising:
   a base having an outer edge;
   a spine hingedly connected to the base;
   a lid hingedly connected to the spine and movable between open and closed positions;
   a sidewall connected to the base, the sidewall having a pair of end walls and a front wall;
   each of the end walls positioned inward from the outer edge of the base to form a ledge;
   a pair of tabs mounted on the spine, the tabs being disposed inwardly of the end walls when the lid is in the closed position;
   the spine having first and second ends; one tab being positioned at the first end of the spine and one tab being positioned at the second end of the spine; no portion of the spine extending beyond the tabs; and
   a locking mechanism that selectively locks the lid in the closed position; the locking mechanism only releasing the lid through the use of a key.

15. The security container of claim 14, wherein the sidewall has at least one locking hole that is aligned with another locking hole formed in the lid when the lid is in the closed position.

16. The security container of claim 14, wherein the locking mechanism is detached from the base when unlocked.

* * * * *